(12) United States Patent
Dow et al.

(10) Patent No.: US 7,950,989 B2
(45) Date of Patent: May 31, 2011

(54) COMBINE WITH AN ENDLESS CONVEYOR THAT CAN BE MOVED BETWEEN A SWATH DEPOSITING POSITION AND A CHOPPER POSITION

(75) Inventors: Chad A. Dow, East Moline, IL (US); Mark L. Pearson, Leclaire, IA (US); Joel D. Ferris, Davenport, IA (US); Dirk Weichholdt, Woelfling les Sarreguemines (FR); Rico Priesnitz, Lebach (DE); Fritz K. Lauer, Krähenberg (DE); Oliver Klein, Lebach (DE)

(73) Assignee: Deere & Company, Moline, IL (US)

( * ) Notice: Subject to any disclaimer, the term of this patent is extended or adjusted under 35 U.S.C. 154(b) by 214 days.

(21) Appl. No.: 12/188,278

(22) Filed: Aug. 8, 2008

(65) Prior Publication Data
US 2009/0042625 A1 Feb. 12, 2009

Related U.S. Application Data

(60) Provisional application No. 60/954,944, filed on Aug. 9, 2007.

(51) Int. Cl.
*A01F 12/40* (2006.01)
(52) U.S. Cl. ...................................................... 460/112
(58) Field of Classification Search ........ 56/8, 111–114, 56/901, 500, 504; 460/500, 504, 8, 111–114, 460/901
See application file for complete search history.

(56) References Cited

U.S. PATENT DOCUMENTS

| | | | | |
|---|---|---|---|---|
| 3,450,286 | A * | 6/1969 | Tessman | 414/505 |
| 4,913,679 | A * | 4/1990 | Bender | 460/112 |
| 5,036,652 | A * | 8/1991 | Schmittbetz et al. | 56/16.4 R |
| 5,232,405 | A * | 8/1993 | Redekop et al. | 460/112 |
| 6,416,405 | B1 * | 7/2002 | Niermann | 460/79 |
| 6,688,972 | B2 * | 2/2004 | Buermann et al. | 460/112 |
| 6,736,721 | B2 * | 5/2004 | Niermann et al. | 460/112 |
| 7,001,269 | B2 * | 2/2006 | Weichholdt | 460/112 |
| 7,066,810 | B2 * | 6/2006 | Farley et al. | 460/112 |
| 7,455,584 | B2 * | 11/2008 | Farley et al. | 460/111 |
| 7,648,413 | B2 * | 1/2010 | Duquesne et al. | 460/112 |
| 2003/0003974 | A1 * | 1/2003 | Niermann et al. | 460/111 |
| 2004/0176150 | A1 * | 9/2004 | Gryspeerdt et al. | 460/112 |
| 2005/0059445 | A1 * | 3/2005 | Niermann et al. | 460/112 |
| 2005/0282602 | A1 * | 12/2005 | Redekop et al. | 460/112 |
| 2006/0166723 | A1 * | 7/2006 | Farley et al. | 460/112 |
| 2006/0246966 | A1 * | 11/2006 | Smith | 460/112 |

FOREIGN PATENT DOCUMENTS

| | | |
|---|---|---|
| DE | 100 64 356 A1 | 7/2002 |
| DE | 102 56 744 A1 | 6/2004 |
| EP | 345829 A2 * | 12/1989 |

* cited by examiner

*Primary Examiner* — Thomas B Will
*Assistant Examiner* — Joan D Misa
(74) *Attorney, Agent, or Firm* — Taylor IP, PC

(57) ABSTRACT

A combine is provided, with a harvested crop processing arrangement with an outlet for straw that is associated with an ejection drum and an endless conveyor arranged between the ejection drum and a straw chopper. In its rear region, the endless conveyor can be pivoted about a horizontal axis extending transverse to the direction of operation between a chopper position and a swath depositing position.

16 Claims, 1 Drawing Sheet

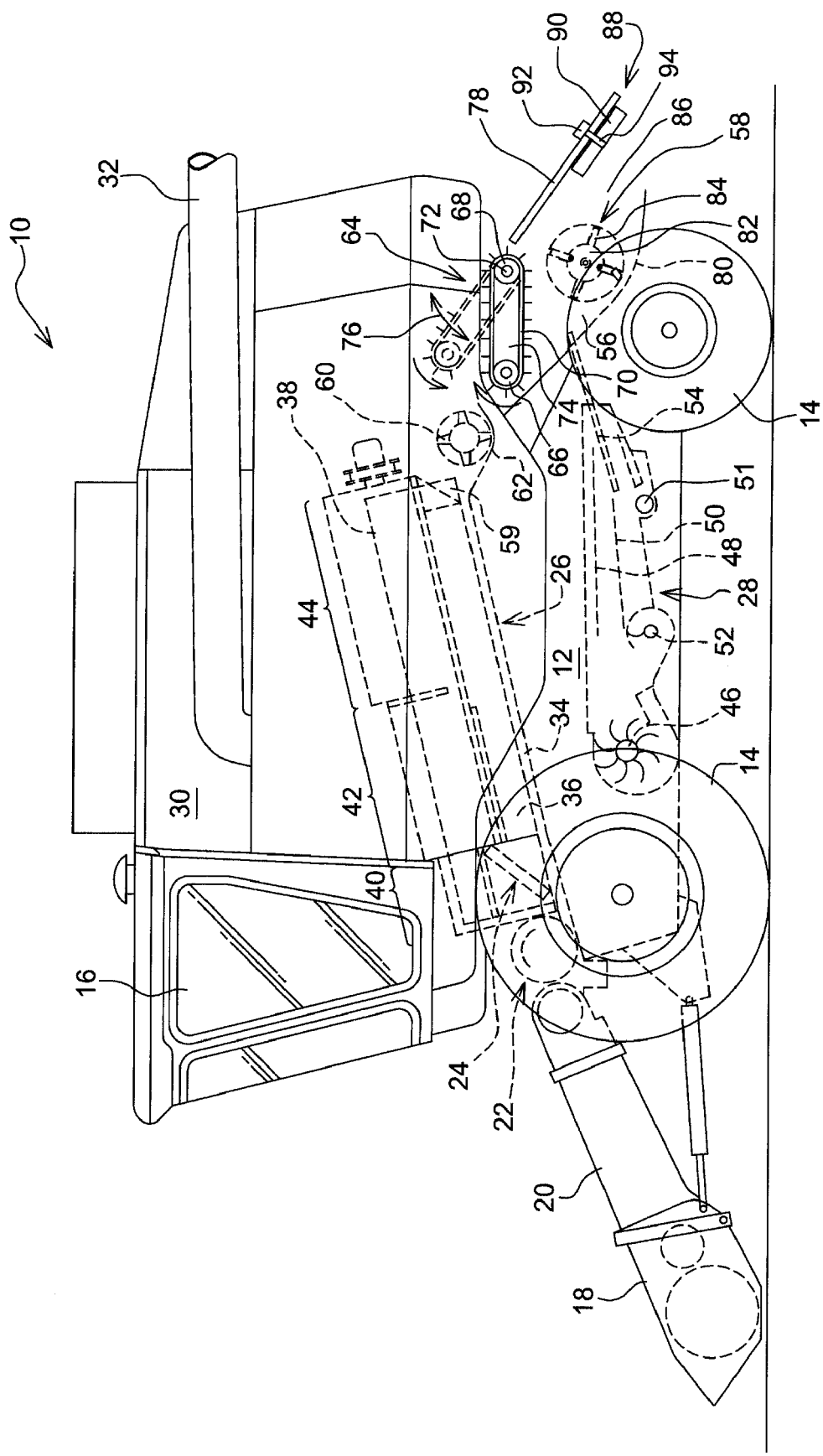

COMBINE WITH AN ENDLESS CONVEYOR THAT CAN BE MOVED BETWEEN A SWATH DEPOSITING POSITION AND A CHOPPER POSITION

CROSS REFERENCE TO RELATED APPLICATIONS

This is a non-provisional application based upon U.S. provisional patent application Ser. No. 60/954,944, entitled "COMBINE WITH AN ENDLESS CONVEYOR THAT CAN BE MOVED BETWEEN A SWATH DEPOSITING POSITION AND A CHOPPER POSITION", filed Aug. 9, 2007, which is incorporated herein by reference.

FIELD OF THE INVENTION

The invention relates to combines having straw choppers, and more particularly to combines having a device that is positionable for deflecting straw into the straw chopper or directly onto the ground in a swath.

BACKGROUND OF THE INVENTION

Agricultural combines are large machines that harvest, thresh, separate and clean agriculturally cultivated grain. The clean grain is stored in a grain tank arranged on the combine. As a rule, the threshed-out straw is either chopped and distributed across the field over the width of the cutter head or conducted around the straw chopper and deposited on the field in a swath without being chopped in order to be able to take it up subsequently with a baler. The rest of the harvested crop that remains at the rear outlet of the grain cleaning arrangement, such as chaff and small straw particles, are distributed across the field by a chaff spreader or conducted through the straw chopper and distributed across the field. The last named solution has the advantage that no separate chaff spreader is required but it requires that the straw be conducted around the rear of the straw chopper in the swath operating mode. Examples of such combines are described by DE 100 64 356 A and DE 102 56 744 A.

In DE 100 64 356 A, a sheet metal guide plate is located underneath the rear straw outlet of an axial separating arrangement, it is connected with its lower end to the frame of the combine in joints so as to pivot about a horizontal pivot axis extending transverse to the forward direction of operation. It can pivot between a swath depositing position, in which it extends at an angle upward and towards the front and that guides the straw that was ejected from the axial separating arrangement along its rear side to the rear of the straw chopper, and a chopper position in which it extends approximately vertically and guides the straw along its forward side into the straw chopper arranged underneath the pivot axis. In both modes of operation the chaff and small straw particles are conveyed by the suction effect of the straw chopper into the straw chopper during the cleaning.

DE 102 56 744 A proposes that a straw guide element connected at joints and pivoted about a horizontal axis extending transverse to the direction of operation be arranged to pivot about the axis of rotation of an ejection drum arranged underneath the outlet of an axial separating arrangement. Accordingly, the straw can be guided into the straw chopper or conducted past its rear side onto the ground, when the straw guide element is pivoted into the corresponding position. The chaff and small straw particles are conveyed into the inlet of the straw chopper by a conveying chute.

In the case of the two arrangements described that accomplish the deflection of the harvested crop by way of pivoted, but essentially rigid and stationary guide elements, it is seen as a disadvantage for the supply of straw to the straw chopper or for the deposit of swaths to the rear of the straw chopper, that the attainable throughput is limited by the friction of the harvested crop against the guide elements. A further problem lies in the fact that the straw chopper must be arranged further to the rear on the basis of the increase in the capacity of the newer implements in current practice that lead to cleaning arrangements of increased length, which makes it more difficult to convey the straw from a separating arrangement to the straw chopper either without (DE 100 64 356 A) or by way of a single driven conveying arrangement (DE 102 56 744 A).

DE 36 44 900 A describes another combine in which a straw guide surface is provided that can be pivoted between a swath depositing position and a chopper position and is located between the rear outlet of a straw shaker and the inlet of the straw chopper, the straw guide surface can be pivoted between a swath depositing position and a chopper position. At its lower end the straw guide surface can be pivoted about a horizontal pivot axis extending transverse to the direction of operation which is connected in joints to the frame of the combine in order to pivot between the swath depositing position in which it extends at an angle upward and to the rear and conducts the straw ejected by the straw shaker onto the ground ahead of the straw chopper and a chopper position in which it extends at an angle upward and to the front and guides the straw into the straw chopper arranged to the rear of the pivot axis. In an embodiment the straw guide element is configured as a conveyor belt. In this arrangement it is seen as a disadvantage that a separate chaff spreader is required in order to distribute the chaff and small straw particles that were produced by the cleaning arrangement across the field, while the straw is deposited ahead of the straw chopper in the swath depositing mode.

U.S. Pat. No. 7,066,810 B is seen as forming a class; it describes a further combine in which a conveyor belt follows an ejection drum arranged downstream and to the rear of an axial separating arrangement. Sheet metal guide plates are attached to the back side of the conveyor belt, these form a duct extending downward in the chopper mode and conduct the straw into the straw chopper attached to the rear end of the conveyor belt, and located above and to the rear of the end of the belt, the chopper chops the straw and distributes it across the field. The remains from the cleaning of the harvested crop are distributed across the field by a chaff spreader. Moreover the sheet metal guide plates can be brought into a swath position in which they guide the straw onto the field to the rear of the straw chopper. Furthermore, a position is provided for the distribution of the remains of the harvested crop in which the sheet metal guide plate, that formed the forward wall of the duct in the chopper position, is pivoted at an angle to the rear, so that the crop that is to be chopped can move downward ahead of the straw chopper and be deposited on the ground mixed with the chaff from the chaff spreader. In place of the sheet metal guide plate the conveyor belt can also be pivoted into an approximately vertical position about the axis of rotation of its forward or its rear deflecting rolls, in which it conducts the straw onto the ground which was thrown by the ejection drum against its front side. Here the disadvantage is seen in the fact that separate chaff spreaders are required and that a multitude of moving components are necessary to attain the various operating modes.

What is needed in the art is a combine in which the straw can be conveyed away in the swath deposit mode as well as the chopper mode without any problems.

SUMMARY OF THE INVENTION

The present invention, in one form thereof, is a combine including a chassis that can be moved across a field in a forward operating direction and a harvested crop processing arrangement arranged in the chassis, which threshes and separates the harvested crop that was taken up by a front harvesting attachment. The straw that was threshed out and generally released from the grain is ejected through an outlet of the harvested crop processing arrangement and taken over by a rotating ejection drum, which conveys it to the rear and delivers it to an endless conveyor. The endless conveyor includes a front deflecting roll, a rear deflecting roll and a conveyor belt that encloses the deflecting rolls. At least one of the deflecting rolls can be driven in either of two directions of rotation, in order to bring the conveyor belt into movement. In the area of its rear deflecting roll the endless conveyor is connected in joints, free to pivot, particularly about the axis of rotation of its rear deflecting roll in order to pivot about its horizontal axis that extends transverse to the forward operating direction, in order to be able to move the endless conveyor between a chopper position and a swath depositing position. In the swath depositing position the endless conveyor extends at least approximately horizontally and operates in an overshot mode. The upper side of the conveyor belt moves towards the rear and delivers the straw at its downstream end to a guide surface, arranged immediately to the rear of the rear deflecting roll, that extends at an angle to the rear and downward, and that guides the straw in a swath to the ground. In the chopper position the endless conveyor is pivoted upward about its pivot axis, so that its forward deflecting roll is raised relative to its swath depositing position, so that the conveyor belt extends at an angle upward and to the front or exactly upward. In the chopper position the endless conveyor is driven in the opposite direction to that of the swath depositing position so that the surface of the conveyor belt facing the ejection drum moves downward and conveys the straw actively and in an undershot mode into the straw chopper. The latter chops the straw and deposits it in a broadly distributed manner across the field.

In this way the result is an exchange between the chopper operation and the swath depositing mode without any problems by pivoting only the endless conveyor. The straw is conveyed actively in both operating modes by the endless conveyor, so that blockage of the flow of harvested crop need not be feared.

The conveying of the straw by the guide surface to the rear of the straw chopper makes it possible for a cleaning system to deliver the remains of the harvested crop produced (chaff and straw particles) into the inlet of the straw chopper in both the swath deposit operation and the chopper operation. The conveying of the chaff from the cleaning arrangement to the straw chopper can be performed by a flow of air or a conveying chute or the outlet of the cleaning arrangement is directly adjacent to the inlet of the straw chopper.

BRIEF DESCRIPTION OF THE DRAWINGS

The FIGURE shows a partial section in the side view of a combine with an axial harvested crop processing arrangement and an embodiment of an endless conveyor of the present invention that can be moved between a swath depositing position and a chopper position.

DETAILED DESCRIPTION OF THE INVENTION

The FIGURE shows an agricultural combine 10 with a chassis 12 with wheels 14 in contact with the ground. Wheels 14 are fastened to chassis 12 and are used for the propulsion of combine 10 in the forward operating direction extending to the left in the FIGURE. The operation of combine 10 is controlled from an operator's cab 16. A cutter head 18 is used to harvest crop containing grain and to deliver it to a slope conveyor 20. The harvested crop is conducted by slope conveyor 20 to a guide drum 22. Guide drum 22 guides the harvested crop through an inlet transition section 24 to an axial harvested crop processing arrangement 26.

In the following discussion the directions cited, such as front and rear, refer to the forward operating direction of combine 10.

The harvested crop processing arrangement 26 includes a rotor housing 34 and a rotor 36 arranged therein. Rotor 36 includes a hollow drum 38 to which crop processing elements are fastened for a charging section 40, a threshing section 42 and a separating section 44. Charging section 40 is arranged on the front side of axial harvested crop processing arrangement 26. Threshing section 42 and separating section 44 are located in a longitudinal direction downstream and to the rear of charging section 40. In charging section 40 drum 38 is in the form of a truncated cone. Threshing section 42 includes a forward section in the form of a truncated cone and a cylindrical rear section. Cylindrical separating section 44 of drum 38 is located at the end of axial harvested crop processing arrangement 26. In place of an axial harvested crop processing arrangement 26, a tangential threshing drum and a subsequent axial separating arrangement or a straw shaker could be used.

Grain and chaff that fall through a threshing basket, associated with threshing section 42 and a separating grate associated with separating section 44, are conducted to a cleaning system 28 having a blower 46 and disk-shaped sieves 48 and 50 that can be brought into an oscillating movement. Cleaning system 28 removes the chaff and conducts the clean grain over a screw conveyor 52 to an elevator for clean grain (not shown). The elevator for clean grain deposits the clean grain into a grain tank 30. The clean grain in the grain tank 30 can be unloaded by an unloading screw conveyor 32 to a grain wagon, a trailer or a truck. Harvested crop remaining at the rear end of the lower disk-shaped sieve 50 is again conducted to the harvested crop processing arrangement 26 by way of a screw conveyor 51 and an overshot conveyor (not shown). The harvested crop remains are delivered to the rear end of upper disk-shaped sieve 48, that consist generally of chaff and small straw particles, are conveyed by an oscillating chute conveyor 54 to the rear and into an inlet 56 of a straw chopper 58. The word "straw" used herein is meant to convey a meaning of plant stalk and residue material.

Threshed-out straw, leaving separating section 44, is ejected through an outlet 59 from the harvested crop processing arrangement 26 and conducted to a straw conveying system that includes elements that convey the straw out of combine 10 including an ejection drum 60. Ejection drum 60, which interacts with a chute 62 arranged underneath it, ejects the straw to the rear. An endless conveyor 64 is located to the rear of ejection drum 60. Endless conveyor 64 includes a forward deflecting roll 66, a rear deflecting roll 68, a conveyor belt 70 that encloses deflecting rolls 66 and 68, and connecting struts 74 which connect deflecting rolls 66 and 68. Endless conveyor 64 is supported by bearings, and is free to pivot about horizontal axis 72 extending transverse to the forward operating direction. Horizontal axis 72 is the axis of rear deflecting roll 68, so that it can be adjusted in the direction of arrow 76. The surface of conveyor belt 70 may be equipped with projecting drivers extending over the width of the belt.

Endless conveyor 64 is oriented horizontally, at least approximately, in its lower, swath depositing position shown in the FIGURE in solid lines. One of its deflecting rolls 66 or 68 is driven in the clockwise direction about its axis 72, so that the upper side of conveyor belt 70 with the straw lying upon it is moved towards the rear. A hydraulic motor is used to drive deflecting roll 66 or 68. A guide surface 78 extending at an angle to the rear and downward follows immediately to the rear of rear deflecting roll 68 of endless conveyor 64. Guide surface 78 permits the straw to slide downward onto the ground. The swath of the straw can be brought into a desired shape by way of guide runners or guide rakes (not shown).

Straw chopper 58 is located underneath guide surface 78, being composed of a housing 80 containing a rotor 82 that can rotate about a horizontal axis extending transverse to the direction of operation with chopper knives 84 suspended pendulously and distributed around the circumference of rotor 82. Guide surface 78 forms an upper housing for straw chopper 58. Two blowers 88 are arranged side-by-side underneath guide surface 78, they are located downstream of outlet 86 of straw chopper 58, only one of the blowers can be recognized in the FIGURE. Blowers 88 include a number of air conveying blades 90 each of which is connected to a shaft 94 extending orthogonally to guide surface 78. Each of shafts 94 can be brought into rotation by a hydraulic motor 92. In the swath depositing position straw chopper 58 conveys only the harvested crop remains from cleaning system 28 to blowers 88 which distribute those remains on the ground approximately across the width of cutter head 18. In place of blowers 88 a number of rigid or vibrating sheet metal straw guide plates, arranged alongside each other, could also be used.

For the chopping of straw endless conveyor 64 can be brought into its chopper position (shown in dashed lines) manually by the operator by way of an appropriate lever or by way of a drive actuated by external forces from operator's cab 16. In the chopper position forward deflecting roll 66 of endless conveyor 64 is pivoted upward and endless conveyor 64 is rotated accordingly in the clockwise direction about axis 72 of rear deflecting roll 68 as seen in the FIGURE. Endless conveyor 64 is now driven in the opposite direction to that of its movement in the swath depositing position so that the upper surface of conveyor belt 70 facing ejection drum 60 and extending at an angle to the front and downward, moves downward and conducts the straw conveyed away by ejection drum 60 actively downward into inlet 56 of straw chopper 58, that chops it together with the harvested crop remains from cleaning system 28 and distributes it across the field by way of blowers 88.

Having described the preferred embodiment, it will become apparent that various modifications can be made without departing from the scope of the invention as defined in the accompanying claims.

The invention claimed is:

1. A combine, comprising:
a chassis that is moved over a field in a forward operating direction;
a harvested crop processing arrangement with an outlet for straw;
a rotating ejection drum associated with the outlet;
a straw chopper;
an endless conveyor including:
a forward deflecting roll;
a rear deflecting roll; and
a conveyor belt extending around both of the deflecting rolls; and a guide surface arranged above and to the rear of the straw chopper and extending at an angle to the rear and downward, said guide surface having a forward end located above the straw chopper;
the endless conveyor arranged between the ejection drum and the straw chopper, the conveyor belt being configured to be driven in either of two directions, the endless conveyor being pivotable about a pivot axis between a chopper position for the conveying of straw into the straw chopper thereby defining a chopper operation mode and a swath depositing position for the deposit of swaths on the ground thereby defining a swath depositing mode, said pivot axis being proximate a rear region of the endless conveyor, the conveyor belt being configured to be driven in a first direction in the swath depositing position and in a second direction in the chopper position, the pivot axis of the endless conveyor being located immediately ahead of the guide surface and substantially aligned with the forward end of the guide surface, the endless conveyor extending substantially horizontally in the swath depositing position and is driven so as to convey the straw on an upper side of the conveyor belt to the guide surface, the forward deflecting roll of the endless conveyor being raised when the endless conveyor is in the chopper position, the forward deflecting roll being lowered when the endless conveyor is in the swath depositing position by pivoting the endless conveyor about the pivot axis, the combine changing between the chopper operation mode and the swath depositing mode by pivoting only the endless conveyor about said pivot axis.

2. The combine of claim 1, wherein the rear deflecting roll rotates about the pivot axis.

3. The combine of claim 1, further comprising a cleaning system that conducts harvested crop remains onto said guide surface by way of the endless conveyor, when the endless conveyor is in the swath depositing position and into an inlet of the straw chopper when the endless conveyor is in the chopper position.

4. The combine of claim 1, wherein said straw chopper includes a plurality of pendulously suspended chopper knives.

5. The combine of claim 1, further comprising at least one blower coupled to an underneath portion of the guide surface.

6. The combine of claim 5, wherein the at least one blower receives and distributes harvested crop remains when the endless conveyor is in the chopper position.

7. The combine of claim 6, wherein the at least one blower does not receive the straw when the endless conveyor is in the swath position.

8. The combine of claim 1, wherein the guide surface extends at a downward angle toward the rear of the chassis, the guide surface immediately following the rear deflecting roll.

9. A straw conveying system for use in a combine having a chassis that is moved over a field in a forward operating direction and a harvested crop processing arrangement with an outlet for straw, the straw conveying system comprising:
a rotating ejection drum associated with the outlet;
a straw chopper;
an endless conveyor including:
a forward deflecting roll;
a rear deflecting roll; and
a conveyor belt extending around both of the deflecting rolls; and a guide surface arranged above and to the rear of the straw chopper and extending at an angle to the rear and downward, said guide surface having a forward end located above the straw chopper;

the endless conveyor arranged between the ejection drum and the straw chopper, the conveyor belt being configured to be driven in either of two directions, the endless conveyor being pivotable about a pivot axis between a chopper position for the conveying of straw into the straw chopper thereby defining a chopper operation mode and a swath depositing position for the deposit of swaths on the ground thereby defining a swath depositing mode, said pivot axis being proximate a rear region of the endless conveyor, the conveyor belt being configured to be driven in a first direction in the swath depositing position and in a second direction in the chopper position, the pivot axis of the endless conveyor being located immediately ahead of the guide surface, the endless conveyor extending substantially horizontally in the swath depositing position and is driven so as to convey the straw on an upper side of the conveyor belt to the guide surface and substantially aligned with the forward end of the guide surface, the forward deflecting roll of the endless conveyor being raised when the endless conveyor is in the chopper position, the forward deflecting roll being lowered when the endless conveyor is in the swath depositing position by pivoting the endless conveyor about the pivot axis, the combine changing between the chopper operation mode and the swath depositing mode by pivoting only the endless conveyor about said pivot axis.

10. The straw conveying system of claim 9, wherein the rear deflecting roll rotates about the pivot axis.

11. The straw conveying system of claim 9, further comprising a cleaning system that conducts harvested crop remains onto said guide surface by way of the endless conveyor, when the endless conveyor is in the swath depositing position and into an inlet of the straw chopper when the endless conveyor is in the chopper position.

12. The straw conveying system of claim 9, wherein the straw chopper includes a plurality of pendulously suspended chopper knives.

13. The straw conveying system of claim 9, further comprising at least one blower coupled to an underneath portion of the guide surface.

14. The straw conveying system of claim 13, wherein the at least one blower receives and distributes harvested crop remains when the endless conveyor is in the chopper position.

15. The straw conveying system of claim 14, wherein the at least one blower does not receive the straw when the endless conveyor is in the swath position.

16. The straw conveying system of claim 9, wherein the guide surface extends at a downward angle toward the rear of the chassis, the guide surface immediately following the rear deflecting roll.

\* \* \* \* \*